(12) United States Patent
Liao et al.

(10) Patent No.: US 8,374,806 B2
(45) Date of Patent: Feb. 12, 2013

(54) ULTRASONIC PHASE-SHIFT DETECTION DEVICE

(75) Inventors: Shu-Ting Liao, Taipei (TW); Chao-Fa Lee, Taipei (TW); Cheng-Hsing Kuo, Taipei (TW)

(73) Assignee: Tatung Company, Taipei (TW)

( * ) Notice: Subject to any disclaimer, the term of this patent is extended or adjusted under 35 U.S.C. 154(b) by 338 days.

(21) Appl. No.: 12/923,548

(22) Filed: Sep. 28, 2010

(65) Prior Publication Data

US 2012/0041693 A1 Feb. 16, 2012

(30) Foreign Application Priority Data

Aug. 13, 2010 (TW) .............................. 99127091 A

(51) Int. Cl.
*G01F 1/66* (2006.01)
(52) U.S. Cl. ............... 702/48; 702/45; 702/50; 702/54; 73/61.45; 73/861.28; 73/861.22; 73/861.27
(58) Field of Classification Search ................ 702/45, 702/48, 50, 54; 73/61.44, 61.45, 861.18, 73/861.31, 861.28, 861.29, 861.22, 861.23, 73/861.24, 861.27, 32 A; 327/552
See application file for complete search history.

(56) References Cited

U.S. PATENT DOCUMENTS

| | | | | |
|---|---|---|---|---|
| 3,780,577 A * | 12/1973 | Brown | ........................ | 73/861.28 |
| 3,818,757 A * | 6/1974 | Brown | ........................ | 73/861.28 |
| 4,145,914 A * | 3/1979 | Newman | ..................... | 73/290 V |
| 4,372,166 A * | 2/1983 | Loveland | ................... | 73/861.28 |
| 5,117,698 A * | 6/1992 | Baumoel | .................... | 73/861.28 |
| 5,224,075 A * | 6/1993 | Iino et al. | .......................... | 367/91 |
| 5,737,280 A * | 4/1998 | Kokubo | ........................... | 368/2 |
| 5,777,238 A * | 7/1998 | Fletcher-Haynes | ........ | 73/861.31 |
| 5,841,035 A * | 11/1998 | Andoh et al. | ............... | 73/861.22 |
| 6,062,091 A * | 5/2000 | Baumoel | ................. | 73/861.27 |
| 6,119,070 A * | 9/2000 | Beneteau et al. | ............... | 702/45 |
| 7,543,508 B2 * | 6/2009 | Lang | .......................... | 73/861.28 |
| 8,120,500 B2 * | 2/2012 | Tokhtuev et al. | ............. | 340/618 |
| 2008/0190213 A1 * | 8/2008 | Lang | .......................... | 73/861.28 |
| 2008/0242987 A1 * | 10/2008 | Shifrin | .......................... | 600/443 |

* cited by examiner

*Primary Examiner* — Carol Tsai
(74) *Attorney, Agent, or Firm* — Bacon & Thomas, PLLC

(57) ABSTRACT

An ultrasonic phase-shift detection device includes a clock generator, a divider, a first counter, a comparator, a phase detector and a second counter. The divider is provided for dividing the clock signal to generate ultrasonic signals. The comparator is provided for comparing the counting value of the first counter and a predetermined number. The phase detector is provided for comparing the phase shift between different ultrasonic signals. The second counter is provided for counting to generate the digital result signal.

11 Claims, 3 Drawing Sheets

ULTRASONIC PHASE-SHIFT DETECTION DEVICE

BACKGROUND OF THE INVENTION

1. Field of the Invention

The invention relates to a detection device, and, more particularly, to an ultrasonic phase-shift detection device.

2. Description of Related Art

In the prior art, the state of fluid, such as concentration or velocity of fluid, can be measured by using an ultrasonic flowmeter, which detects the phase shift of the transmitted ultrasonic signals in a fluid. The change of concentration or velocity of fluid may cause the transmitted ultrasonic signals to generate phase shift, and thus the change in concentration or velocity of the fluid can be determined by measuring phase shift of the transmitted ultrasonic signals.

Please refer to FIG. 1, FIG. 1 is a schematic diagram of an ultrasonic flowmeter in the prior art. As shown in FIG. 1, an ultrasonic flowmeter 1 includes a microprocessor 11, a fluid pipe 12, an amplifier 13 and a counter 14. The microprocessor 11 is connected to the fluid pipe 12 and the counter 14. The amplifier 13 is connected to the fluid pipe 12 and the counter 14. The fluid pipe 12 includes a transmitter 121, a receiver 122, an inlet 123 and an outlet 124. The transmitter 121 and the receiver 122 are provided for transmitting and receiving ultrasonic signals respectively, and the inlet 123 and the outlet 124 are provided for fluid to flow in and out respectively. The fluid pipe 12 is filled with the fluid. The microprocessor 11 generates ultrasonic signals and drives the transmitter 121 to transmit the ultrasonic signals, and enables the counter 14 to start counting simultaneously. The receiver 122 sends the received ultrasonic signals to the amplifier 13 for amplification, and enables the counter 14 to stop counting. The counter 14 outputs a digital result signal as the counting result. The above-mentioned procedure of firmware control is quite complicated, and the parameters may need to be modified and corrected very frequently during using. Further, the typical ultrasonic flowmeter should be installed inside the device for fluid measurement during hardware manufacturing. Besides, if an analog signal of measurement result is required, external hardware circuit has to be added for signal conversion.

Therefore, it is desirable to provide an easy-of-use ultrasonic phase-shift detection device capable of outputting both analog and digital measurement results, so as to mitigate and/or obviate the aforementioned problems.

SUMMARY OF THE INVENTION

The object of the invention is to provide an ultrasonic phase-shift detection device for detecting the phase shift of ultrasonic signals to thereby calculate changes in the concentration or velocity of the fluid.

To achieve the object, the ultrasonic phase-shift detection device of the invention includes: a clock generator for generating a clock signal; a divider connected to the clock generator for frequency-dividing the clock signal generated by the clock generator as a frequency-divided clock signal with a predetermined frequency, to thereby generate an input ultrasonic signal with the predetermined frequency; a first counter connected to the divider for counting the received frequency-divided clock signal; a comparator connected to the first counter for comparing the counting value of the first counter and a predetermined number, and sending the input ultrasonic signal when the counting value of the first counter is smaller than or equal to the predetermined number; a phase detector connected to the comparator for receiving the input ultrasonic signal and a transmitted ultrasonic signal and comparing the phase of the two signals, to generate an analog result signal for being outputted by the detection device; and a second counter connected to the phase detector for counting the analog result signal sent by the phase detector to generate the digital result signal for being outputted by the detection device.

In an embodiment of the present invention, the comparator sends the input ultrasonic signal to the phase detector and a transmitter of a fluid pipe simultaneously.

In another embodiment of the present invention, the transmitted ultrasonic signal received by the phase detector is from a receiver of the fluid pipe.

DETAILED DESCRIPTION OF THE INVENTION

Figure 1:
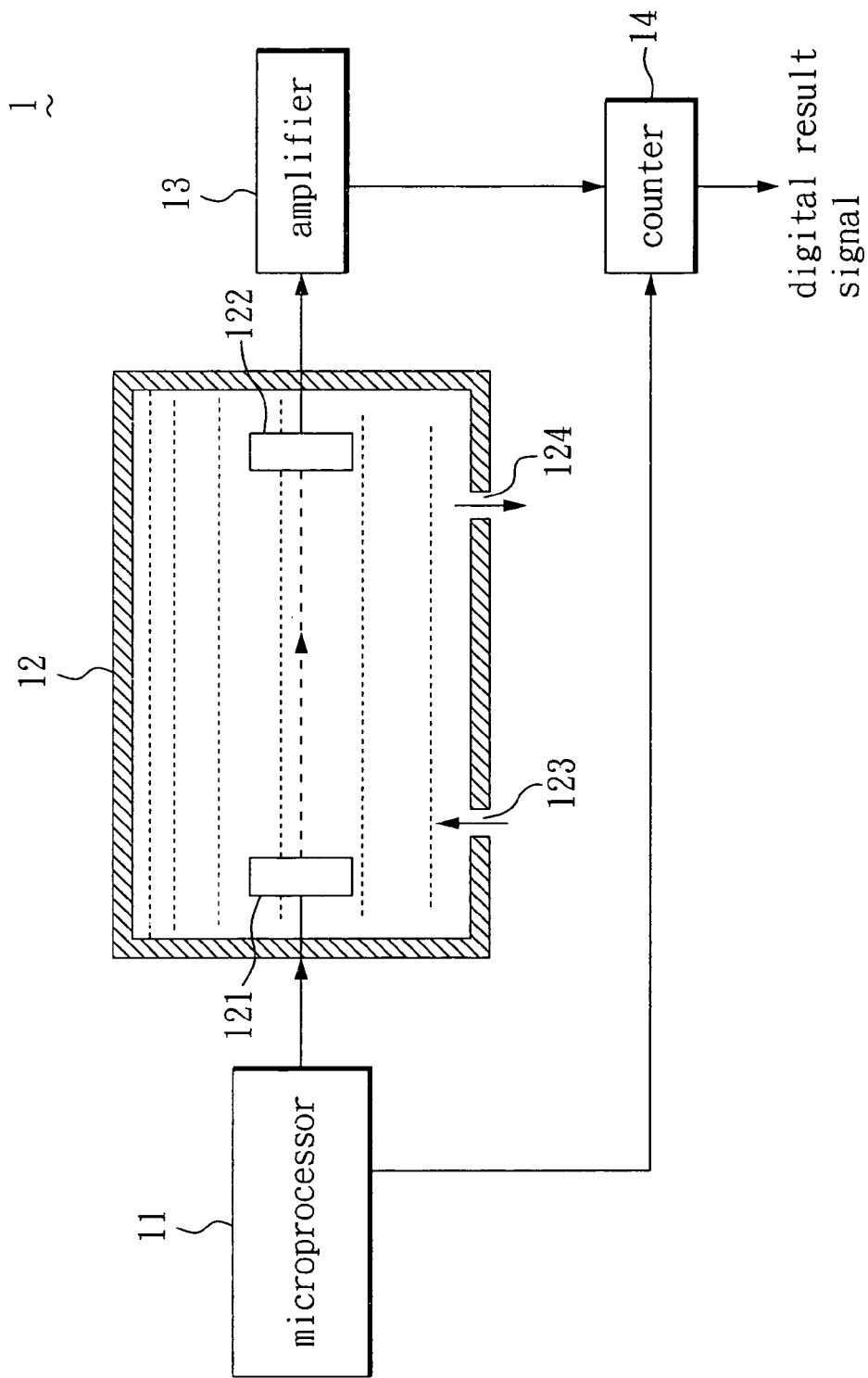
FIG. 1 is a schematic diagram of an ultrasonic flowmeter in the prior art.
Figure 2:
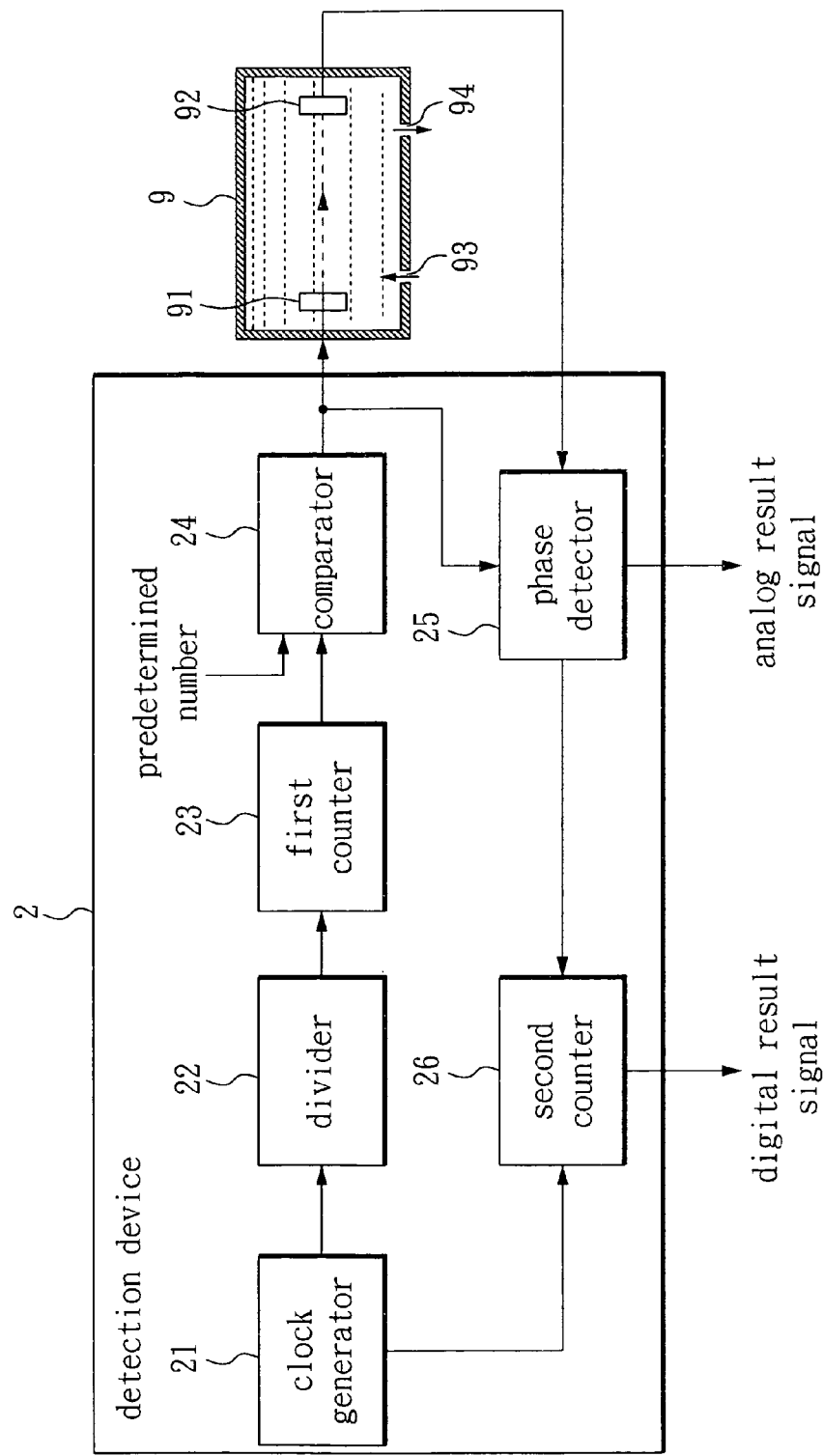
FIG. 2 is a schematic diagram of the ultrasonic phase-shift detection device according to a preferred embodiment of the invention.

Please refer to FIG. 2. FIG. 2 is a schematic diagram of the ultrasonic phase-shift detection device according to a preferred embodiment of the invention. As shown in FIG. 2, the ultrasonic phase-shift detection device 2 is connected to a fluid pipe 9, and includes a clock generator 21, a divider 22, a first counter 23, a comparator 24, a phase detector 25 and a second counter 26. The fluid pipe 9 includes a transmitter 91, a receiver 92, an inlet 93 and an outlet 91. The clock generator 21 is connected to the divider 22 and the second counter 26. The first counter 23 is connected to the divider 22 and the comparator 24. The comparator 24 is connected to the transmitter 91 and the phase detector 25. The phase detector 25 is connected to the transmitter 91 and the receiver 92. The second counter 26 is connected to the phase detector 25.

The fluid pipe 9 is filled with fluid, which flows in and out from the inlet 93 and the outlet 94 respectively. First, a user sets a predetermined number in the comparator 24 based on the requirement, so as to set the number of the ultrasonic signals transmitted from the receiver 91. The clock generator 21 generates a clock signal with a frequency of 20 KHz or larger than 20 KHz. The divider 22 receives the clock signal and frequency-divides the clock signal as a frequency-divided clock signal with a predetermined frequency, to thereby generate an input ultrasonic signal with the predetermined frequency, wherein the predetermined frequency is larger than 20 KHz and is preferred to be, but not limited to, 40 MHz. The first counter 23 counts the received frequency-divided clock signal to thus have a counting value. The comparator 24 compares the counting value of the first counter 23 and the set predetermined number, and transmits the input ultrasonic signal to the transmitter 91 and phase detector 25 simultaneously when the counting value of the first counter 23 is smaller than or equal to the predetermined number. The transmitter 91 transmits the input ultrasonic signal in the fluid pipe 9, and the input ultrasonic signal passes the fluid and is received by the receiver 92 as the transmitted ultrasonic signal. The receiver 92 sends the transmitted ultrasonic signal to the phase detector 25. The phase detector 25 compares the phase of the input ultrasonic signal sent by the comparator 24 and the transmitted ultrasonic signal sent by the receiver 92, and generates an analog result signal for being outputted by the detection device 2, and further sends the analog result signal to the second counter 26 simultaneously. The second counter 26 counts the received analog result signal to have a counting value and generates a digital result signal for being outputted by the detection device 2 based on the frequency of the clock signal and its counting value. The detection device 2 outputs the analog and digital result signals.

Figure 3:
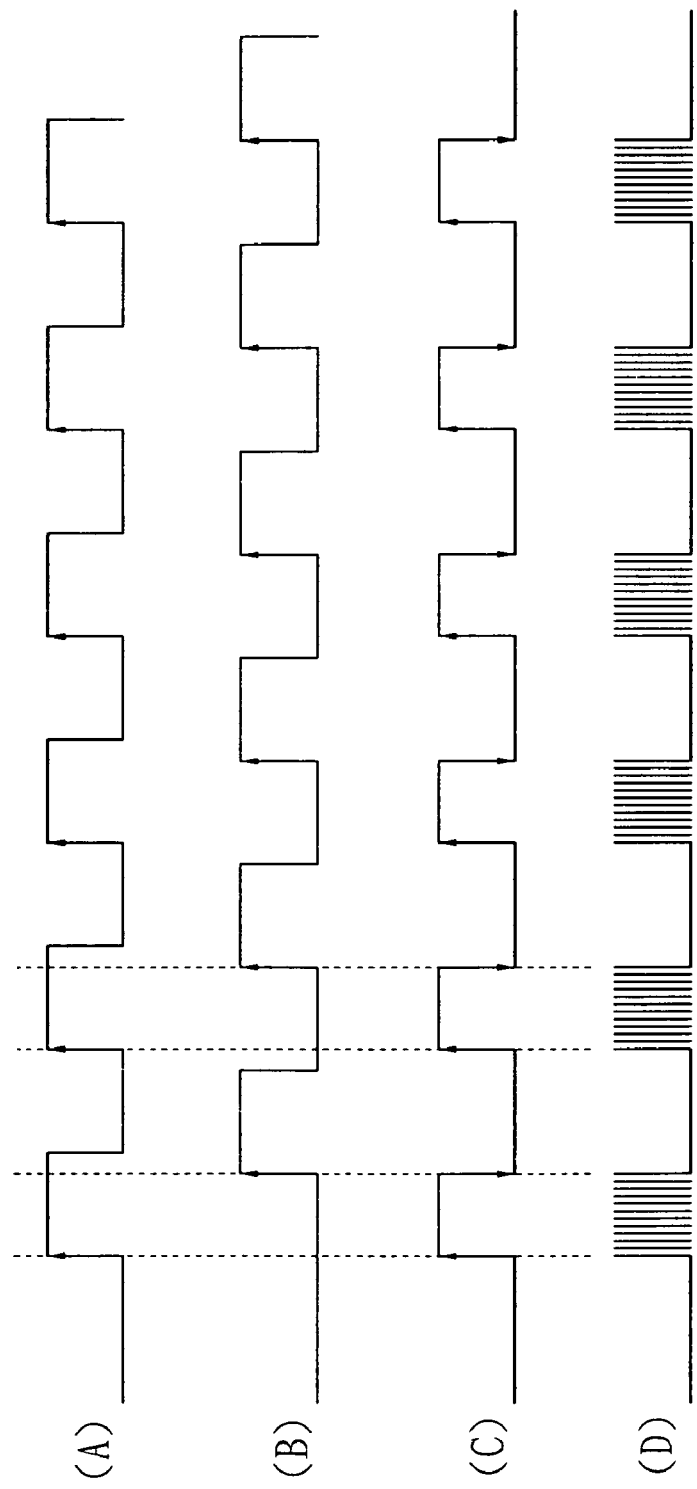
FIG. 3 is a schematic diagram of phase comparison for the phase detector of the ultrasonic phase-shift detection device according to a preferred embodiment of the invention.

The output analog result signal of the ultrasonic phase-shift detection device 2 of the present invention is generated by comparing the phases of the input ultrasonic signal and the transmitted ultrasonic signal. Please refer to FIG. 3. FIG. 3 is a schematic diagram of phase comparison of the phase detector of the ultrasonic phase-shift detection device according to a preferred embodiment of the invention. In FIG. 3, label (A) indicates the input ultrasonic signal received by the phase detector 25, label (B) indicates the transmitted ultrasonic signal received by the phase detector 25, and label (C) indicates the analog result signal generated by the phase detector 25. The phase detector 25 asserts the analog result signal to high when the input ultrasonic signal is high, and asserts the analog result signal to low when the transmitted ultrasonic signal is high, to thereby generate the analog result signal that can represent the phase-shift. In FIG. 3, label (D) indicates that the second counter 26 receives the analog result signal generated by the phase detector 25 and counts. The second counter 26 receives the analog result signal, increases its counting value when the analog result signal is high, and calculates based on its counting value and the frequency of the input ultrasonic signal generated by the clock generator 21, to generate the digital result signal.

The user can also set the predetermined number as a relative large value to set the ultrasonic phase-shift detection device 2 as a continuous mode. With the setting, the comparator 24 sends the input ultrasonic signal to the transmitter 91 continuously for transmission in the fluid pipe 9. The phase detector 25 compares the phase of the input ultrasonic signal and the transmitted ultrasonic signal and outputs the analog result signal continuously.

The ultrasonic phase-shift detection device 2 of the present invention is preferably a programmable logic device (PLD), such as a complex programmable logic device (CPLD), which can achieve a variety of operational and combinational logic in an integrated circuit (IC). Therefore, all of the control and execution procedures of the ultrasonic phase-shift detection device 2 of the present invention, including generation, input and output of ultrasonic signals, phase comparison of ultrasonic signals, and output of result signals, can be achieved by a CPLD IC.

In practical application, the ultrasonic phase-shift detection device of the present invention is an independent device, which can be externally connected to other devices for detection. For example, the ultrasonic phase-shift detection device may be installed inside an oxygen generator for monitoring the concentration of oxygen generated by the oxygen generator. Since the ultrasonic phase-shift detection device of the present invention can be installed in a CPLD IC without a microprocessor, for device manufacturers, such as an oxygen generator manufacturer, the detection device of the present invention can effectively reduce manufacturing costs of products and simplify the measuring procedures. In addition, the ultrasonic phase-shift detection device of the present invention can output measurement results as analog signal and digital signal, and thus the present invention is more flexible and convenient than the prior art in the subsequent signal processing.

Moreover, clock signal is generated by the microprocessor in the prior art, and thus the frequency of the clock signal is easily influenced by the clock of the microprocessor. However, in the ultrasonic phase-shift detection device of the present invention, clock signal is generated by an independent clock generator, and the frequency of clock signal can be modified based on the actual requirement. Therefore, the ultrasonic phase-shift detection device of the present invention can modify the measurement accuracy flexibly.

Although the present invention has been explained in relation to its preferred embodiment, it is to be understood that many other possible modifications and variations can be made without departing from the spirit and scope of the invention as hereinafter claimed.

What is claimed is:

1. An ultrasonic phase-shift detection device comprising:
a clock generator for generating a clock signal;
a frequency divider connected to the clock generator for frequency-dividing the clock signal generated by the clock generator to produce a frequency-divided clock signal with a predetermined frequency, thereby generating an input ultrasonic signal with the predetermined frequency;
a first counter connected to the divider for counting the received frequency-divided clock signal to thus have a counting value;
a comparator connected to the first counter for comparing the counting value of the first counter with a predetermined number, and sending the input ultrasonic signal when the counting value of the first counter is smaller than or equal to the predetermined number;
a phase detector connected to the comparator for receiving the input ultrasonic signal and a transmitted ultrasonic signal and comparing the phase of the two signals so as to generate an analog result signal for being outputted by the detection device; and
a second counter connected to the phase detector for counting the analog result signal sent by the phase detector to generate a digital result signal for being outputted by the detection device.

2. The ultrasonic phase-shift detection device as claimed in claim 1, wherein the comparator sends the input ultrasonic signal to the phase detector and a transmitter of a fluid pipe simultaneously.

3. The ultrasonic phase-shift detection device as claimed in claim 2, wherein the transmitted ultrasonic signal received by the phase detector is from a receiver of the fluid pipe.

4. The ultrasonic phase-shift detection device as claimed in claim 1, wherein the analog result signal is generated by using the phase detector to compare the phase of the input ultrasonic signal with the phase of the transmitted ultrasonic signal, wherein the analog result signal is asserted to high when the input ultrasonic signal is high, and the analog result signal is asserted to low when the transmitted ultrasonic signal is high.

5. The ultrasonic phase-shift detection device as claimed in claim 1, wherein the second counter is connected to the clock generator for obtaining the frequency of the input ultrasonic signal.

6. The ultrasonic phase-shift detection device as claimed in claim 5, wherein the digital result signal is generated by the second counter based on the frequency of the input ultrasonic signal and its counting value.

7. The ultrasonic phase-shift detection device as claimed in claim 1, which is implemented by a complex programmable logic device (CPLD).

8. The ultrasonic phase-shift detection device as claimed in claim 1, wherein the predetermined number is adjustable.

9. The ultrasonic phase-shift detection device as claimed in claim 1, wherein the frequency of the clock signal generated by the clock generator is adjustable.

10. The ultrasonic phase-shift detection device as claimed in claim 1, wherein the frequency of the input clock signal is larger than 20 KHz.

11. The ultrasonic phase-shift detection device as claimed in claim 1, wherein the frequency of the ultrasonic signal is larger than 20 KHz.

* * * * *